US008887102B2

(12) United States Patent
Fu et al.

(10) Patent No.: US 8,887,102 B2
(45) Date of Patent: Nov. 11, 2014

(54) METHOD OF DETERMINING INPUT PATTERN AND COMPUTER READABLE STORAGE MEDIUM

(75) Inventors: Kuang-Yu Fu, Hsin-Chu (TW); Yao-Jen Hsieh, Hsin-Chu (TW); Ming-Jong Jou, Hsin-Chu (TW); Heng-Sheng Chou, Hsin-Chu (TW); Pang-Chiang Chia, Hsin-Chu (TW); Chao-Chen Wang, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 1116 days.

(21) Appl. No.: 12/547,465

(22) Filed: Aug. 25, 2009

(65) Prior Publication Data

US 2010/0251188 A1 Sep. 30, 2010

(30) Foreign Application Priority Data

Mar. 31, 2009 (TW) ................................. 98110718 A (51) Int. Cl.
*G06F 3/033* (2013.01)
*G06F 3/0488* (2013.01)

(52) U.S. Cl.
CPC .................................. *G06F 3/04883* (2013.01)
USPC ........... 715/863; 345/173; 345/179; 345/422; 345/619

(58) Field of Classification Search
CPC ...................................................... G06F 3/0317
USPC .......................................... 715/863; 345/173
See application file for complete search history.

(56) References Cited

U.S. PATENT DOCUMENTS

| | | | | |
|---|---|---|---|---|
| 6,233,351 | B1 * | 5/2001 | Feeney et al. | 382/155 |
| 6,249,606 | B1 * | 6/2001 | Kiraly et al. | 382/195 |
| 6,556,215 | B1 * | 4/2003 | Haga et al. | 345/619 |
| 6,636,232 | B2 * | 10/2003 | Larson | 345/611 |
| 6,744,434 | B2 * | 6/2004 | Kindratenko et al. | 345/423 |
| 7,265,760 | B2 * | 9/2007 | Drory et al. | 345/581 |
| 7,295,707 | B2 * | 11/2007 | Chang et al. | 382/181 |
| 7,663,638 | B2 * | 2/2010 | Sander et al. | 345/582 |
| 7,683,888 | B1 * | 3/2010 | Kennedy | 345/173 |
| 7,788,606 | B2 * | 8/2010 | Patel et al. | 715/863 |
| 2002/0057890 | A1 * | 5/2002 | Iwai et al. | 386/1 |
| 2002/0093520 | A1 * | 7/2002 | Larson | 345/694 |
| 2002/0154819 | A1 * | 10/2002 | Campbell | 382/209 |
| 2003/0103049 | A1 * | 6/2003 | Kindratenko et al. | 345/423 |
| 2003/0210286 | A1 | 11/2003 | Gerpheide | |
| 2005/0212810 | A1 * | 9/2005 | Drory et al. | 345/581 |
| 2005/0216867 | A1 * | 9/2005 | Marvit et al. | 715/863 |
| 2006/0227140 | A1 * | 10/2006 | Ramani et al. | 345/441 |
| 2007/0115287 | A1 * | 5/2007 | Sander et al. | 345/441 |
| 2009/0138830 | A1 * | 5/2009 | Borgaonkar et al. | 715/863 |
| 2009/0193366 | A1 * | 7/2009 | Davidson | 715/863 |
| 2010/0149109 | A1 * | 6/2010 | Elias | 345/173 |
| 2011/0134068 | A1 * | 6/2011 | Shimoni | 345/173 |

* cited by examiner

*Primary Examiner* — William Titcomb
(74) *Attorney, Agent, or Firm* — WPAT, PC; Justin King (57) ABSTRACT

A method of determining input pattern is adapted to be implemented on an electronic apparatus equipped with a touch panel and includes the steps of: detecting a plurality of boundary points between an input pattern inputted through the touch panel and a circumscribed polygon of the input pattern, detecting an area ratio of a polygon defined by the boundary points to the circumscribed polygon, and determining the shape of the input pattern at least according to the area ratio. The present invention also provides a computer readable storage medium having a program stored therein. When the program is executed which enables an electronic apparatus equipped with a touch panel to determine the shape and/or direction of an input pattern inputted through the touch panel.

24 Claims, 5 Drawing Sheets

METHOD OF DETERMINING INPUT PATTERN AND COMPUTER READABLE STORAGE MEDIUM

CROSS-REFERENCE TO RELATED APPLICATIONS

This application is based upon and claims the benefit of priority from the prior Taiwanese Patent Application No. 098110718, filed Mar. 31, 2009, the entire contents of which are incorporated herein by reference.

BACKGROUND

1. Technical Field

The present invention generally relates to touch detection technologies and, particularly to a method of determining input pattern which is adapted to be implemented on an electronic apparatus equipped with a touch panel and a computer readable storage medium.

2. Description of the Related Art

Nowadays, touch panel applications on various electronic apparatuses have become more and more popular, and types of gesture for operating touch panels are becoming more and more diversified also. For the aspect of multi-touch gestures, which can perform specific functions e.g., zoom in, zoom out, rotation of image and etc. of the electronic apparatuses in intuitive manners; however, movement spaces provided by small-sized touch panels to the multi-touch gestures are excessive small, which would result in inconvenience of the electronic apparatuses in use and operability and convenience of the electronic apparatuses are limited accordingly.

BRIEF SUMMARY

The present invention provides a method of determining input pattern, adapted to be implemented on an electronic apparatus equipped with a touch panel, so as to improve the operability and convenience of the electronic apparatus.

The present invention further provides a computer readable storage medium having a program stored therein, when the program is executed which enables an electronic apparatus equipped with a touch panel to implement a method of determining input pattern, so that the operability and convenience of the electronic apparatus can be improved.

In order to achieve one of, a part of or all of the above-mentioned objectives, or to achieve other objectives, an embodiment of the present invention provides a method of determining input pattern which is adapted to be implemented on an electronic apparatus equipped with a touch panel. The method of determining input pattern includes the follow steps: detecting a plurality of boundary points between an input pattern inputted through the touch panel and a circumscribed polygon of the input pattern, detecting an area ratio of a polygon defined by the boundary points to the circumscribed polygon; and determining the shape of the input pattern at least according to the area ratio.

In one embodiment, the input pattern is a non-linear pattern.

In one embodiment, degrees of internal angles of the circumscribed polygon respectively are preset fixed values. Moreover, the degrees of the internal angles of the circumscribed polygon can be preset to be identical with each other.

In one embodiment, the step of determining the shape of the input pattern at least according to the area ratio includes: when the area ratio is above an area ratio threshold, determining the input pattern as a circle; and when the area ratio is below the area ratio threshold, determining the input pattern as an arc.

In one embodiment, the determining of the shape of the input pattern is further according to the amount of the boundary points. In this circumstance, the determining of the shape of the input pattern can include the steps of: when the area ratio is above an area ratio threshold and the amount of the boundary points is equal to the amount of sides of the circumscribed polygon, determining the input pattern as a circle; and when the area ratio is below the area ratio threshold or the amount of the boundary points is less than the amount of the sides of the circumscribed polygon, determining the input pattern as an arc.

In one embodiment, during the input of the input pattern, when detecting a touch object used for inputting the input pattern keeps on still on the touch panel for a predetermined time interval or detecting the touch object has left from the touch panel, determining the input of the input pattern is completed. The step of detecting the boundary points and the step of detecting the area ratio are started to be implemented after the input of the input pattern is completed.

In one embodiment, the method of determining input pattern further includes the step of: generating a corresponding identification code according to the determined shape of the input pattern, so as to perform a corresponding operation.

In one embodiment, the method of determining input pattern further includes the step of: when the area of the polygon defined by the boundary points is below an area threshold, determining no the input pattern is inputted.

In one embodiment, the method of determining input pattern further includes the step of: determining the direction of the input pattern according to the order of appearance of the boundary points during the input of the input pattern. The determined direction of the input pattern can be clockwise direction or counter clockwise direction. Moreover, a corresponding identification code can be generated according to both the determined shape and direction of the input pattern, so as to perform a corresponding operation.

In order to achieve one of, a part of or all of the above-mentioned objectives, or to achieve other objectives, another embodiment of the present invention provides a computer readable storage medium having a program stored therein. When the program is executed, which enables an electronic apparatus equipped with a touch panel to implement the determining of the shape and/or direction of an input pattern inputted through the touch panel.

Compared with the prior art, the method of determining input pattern in accordance with the embodiment of the present invention can carry out an input operation which needs multiple fingers in the prior art, by single touch object (e.g., single finger). Accordingly, the drawback associated with the inconvenience of the electronic apparatus in use and resulting from a small-sized touch panel would not provide enough movement space for multi-touch gestures in the prior art can be overcome, and thus the operability and convenience of the electronic apparatus equipped with a touch panel can be greatly improved.

BRIEF DESCRIPTION OF THE DRAWINGS

These and other features and advantages of the various embodiments disclosed herein will be better understood with respect to the following description and drawings, in which like numbers refer to like parts throughout, and in which:

FIGS. 6(a) and (b) illustrate the determining of clockwise circles, in accordance with an embodiment of the present invention.

FIGS. 7(a) and (b) illustrate the determining of counter clockwise circles, in accordance with an embodiment of the present invention.

DETAILED DESCRIPTION

A method of determining input pattern in accordance with an embodiment of the present invention will be described below in detail with reference to accompanying drawings. The method of determining input pattern is adapted to be implemented on an electronic apparatus (not shown) equipped with a touch panel 10.

Figure 1:
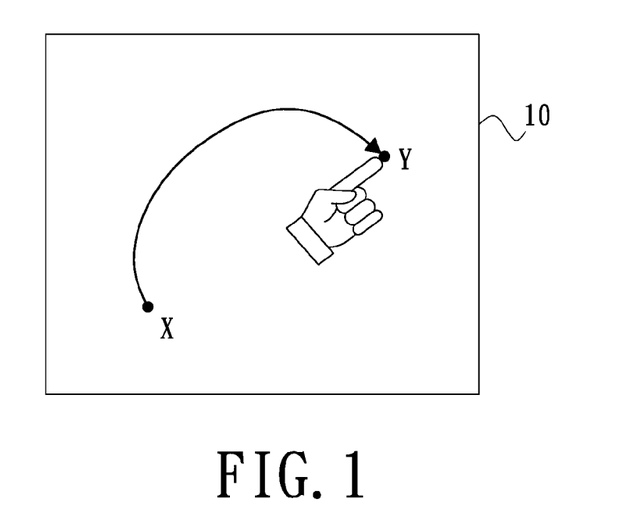
FIG. 1 shows a state during the input of an input pattern inputted through a touch panel, in accordance with an embodiment of the present invention.

Referring to FIG. 1, showing a state during the input of an input pattern inputted through the touch panel 10. As illustrated in FIG. 1, after a finger of the user starts to move from a point X on the touch panel 10, when the electronic apparatus detects the finger keep on still at a point e.g., point Y for a predetermined time interval, the point Y would be determined as the end point of an input pattern. In other words, the input of the input pattern is determined to be completed.

The input pattern is the movement trace of the finger on the touch panel 10. The value of the predetermined time interval can be suitably set according to requirements of practical applications. The finger can be substituted by other touch object for example a stylus. During the input of the input pattern, coordinates of the movement trace of the finger on the touch panel 10 are continuously collected until the input of the input pattern is completed. For example, after the finger keeps on still for several seconds, the input pattern is determined to be completed; or as illustrated in FIG. 2, when detecting the finger has left from the touch panel 10, determining the point Y as the end point of an input pattern, i.e., the input of the input pattern is completed.

Figure 2:
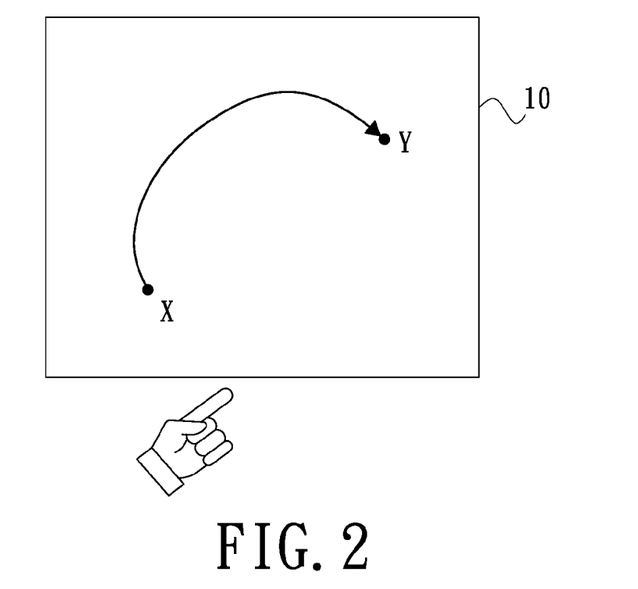
FIG. 2 shows another state during the input of an input pattern inputted through a touch panel, in accordance with another embodiment of the present invention.

It is indicated that, the input patterns as illustrated in FIGS. 1 and 2 are only examples, the user can input any shape of input pattern through the touch panel 10 as required.

Figure 3:
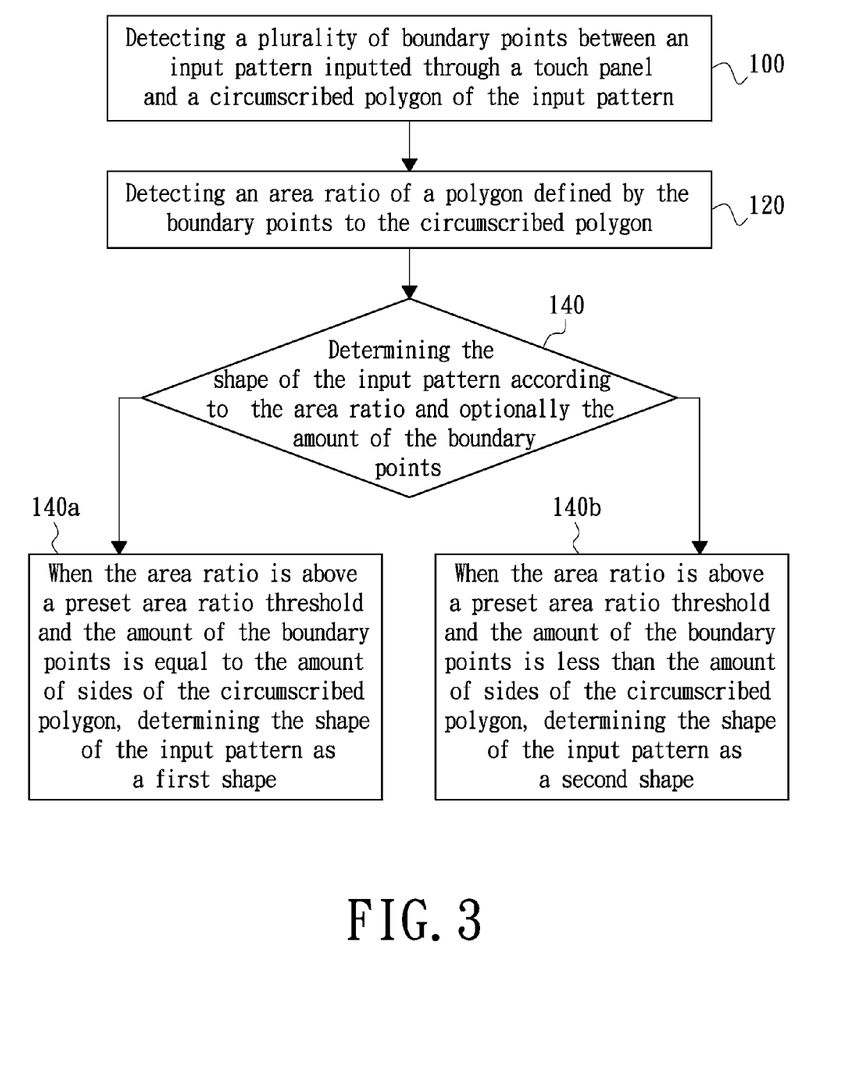
FIG. 3 shows multiple steps of a method of determining input pattern, in accordance with an embodiment of the present invention.

After the input of the input pattern is completed, the method of determining input pattern in accordance with the embodiment of the present invention will implement the steps, as illustrated in FIG. 3, of: detecting a plurality of boundary points between an input pattern inputted through the touch panel 10 and a circumscribed polygon of the input pattern (Step 100), detecting an area ratio of a polygon defined by the boundary points to the circumscribed polygon (Step 120), and determining the shape of the input pattern according to the area ratio and optionally the amount of the boundary points (Step 140). For example, when the area ratio is above a preset area ratio threshold and the amount of the boundary points is equal to the amount of sides of the circumscribed polygon, determining the shape of the input pattern as a first shape (Step 140a) e.g., circle; whereas, when the area ratio is below the preset area ratio threshold and the amount of the boundary points is less than the amount of the sides of the circumscribed polygon, determining the shape of the input pattern as a second shape (Step 140b) e.g., arc.

The illustration associated with the method of determining input pattern in accordance with the embodiment of the present invention how to determine an input pattern as a circle or an arc will be made below in detail with reference to FIGS. 4 and 5.

Figure 4:
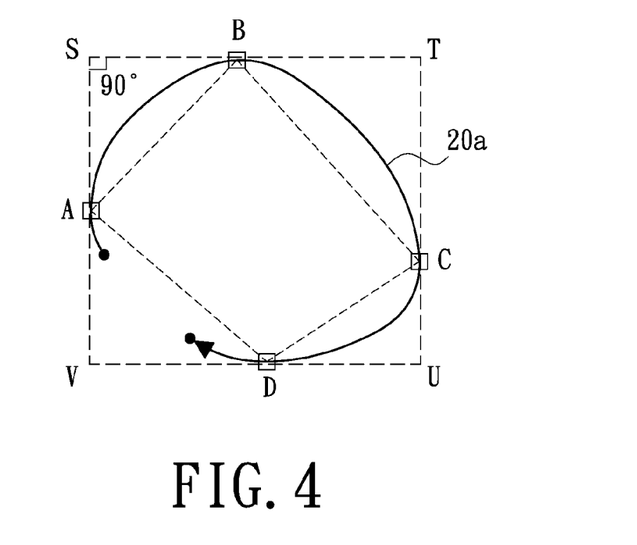
FIG. 4 shows an input pattern inputted through a touch panel and determined as a circle, in accordance with an embodiment of the present invention.

Referring to FIG. 4, showing an input pattern 20a inputted through the touch panel 10 and determined as a circle. As illustrated in FIG. 4, the input pattern 20a and a circumscribed quadrilateral STUV (being a rectangle as illustrated in FIG. 4, all of internal angles thereof are 90 degrees) of the input pattern 20a have four boundary points A, B, C and D existed therebetween. The boundary points A, B, C and D can be acquired by using collected coordinates of a movement trace of a touch object during the input of the input pattern 20a and respectively are the left-most point, the top-most point, the right-most point and the bottom-most point in the present embodiment. A polygon ABCD defined by the boundary points A, B, C and D is an inscribed quadrilateral of the input pattern 20a. The area of the inscribed quadrilateral ABCD is equal to the sum of areas of triangles ABC and ACD, and thus can be calculated by using the triangle area formula. The area of the circumscribed quadrilateral STUV can be easily obtained according to the coordinates of the boundary points A, B, C and D of the circumscribed quadrilateral STUV.

Herein, since the area ratio of the polygon ABCD to the circumscribed quadrilateral STUV is above a preset area ratio threshold, and the amount of the boundary points between the input pattern 20a and the circumscribed quadrilateral STUV of the input pattern 20a is four which is equal to the amount of sides of the circumscribed quadrilateral STUV, the input pattern 20a accordingly meets the condition of being determined as a circle as illustrated in FIG. 3. In the present embodiment, the area ratio threshold can be any value as long as it can achieve the purpose of distinguishing between a circle and an arc, and generally is a range e.g., 0.45 to 0.5. On the other hand, assuming that the area ratio of the polygon ABCD to the circumscribed quadrilateral STUV is below the preset area ratio threshold, the input pattern 20a would be determined as an arc instead.

Figure 5:
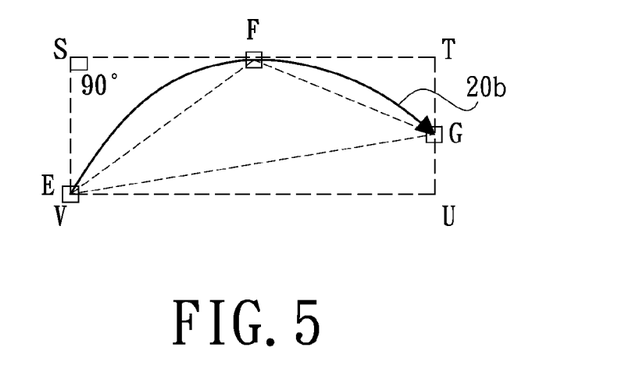
FIG. 5 shows an input pattern inputted through a touch panel and determined as an arc, in accordance with an embodiment of the present invention.

Referring to FIG. 5, showing another input pattern 20b inputted through the touch panel 10 and determined as an arc. As illustrated in FIG. 5, the input pattern 20b and a circumscribed quadrilateral STUV (being a rectangle as illustrated in FIG. 5 and all of internal angles thereof are 90 degrees) of the input pattern 20b have three boundary points E, F and G existed therebetween. The boundary points E, F and G can be acquired by using collected coordinates of a movement trace of a touch object during the input of the input pattern 20b and respectively are the left-most point, the top-most point and the right-most point of the input pattern 20b in the present embodiment. Herein, the left-most point E of the input pattern 20b also is the bottom-most point thereof. In other words, among the left-most point, the top-most point, the right-most point and the bottom-most point of the input pattern 20b, there are two overlapped points. A polygon EFG defined by the boundary points E, F and G is an inscribed triangle of the input pattern 20b and the area of the inscribed triangle EFG can be calculated by using the triangle area formula. The area of the circumscribed quadrilateral STUV can be easily obtained according to the coordinates of the boundary points E, F and G of the circumscribed quadrilateral STUV.

Herein, an area ratio of the polygon EFG to the circumscribed quadrilateral STUV is below the preset area ratio threshold, the amount of the boundary points between the input patterns 20b and the circumscribed quadrilateral STUV of the input pattern 20b is three which is less than the amount of sides of the circumscribed quadrilateral STUV, the input pattern 20b meets the condition of being determined as an arc accordingly, as illustrated in FIG. 3. On the other hand, under the circumstance of the amount of the boundary points between the input pattern and the circumscribed polygon is taken as one basis for determining the shape of the input pattern, even if the area ratio of the polygon EFG to the circumscribed quadrilateral STUV is above the preset area ratio threshold, because the amount of the boundary points between the input pattern 20b and the circumscribed quadrilateral STUV is less than the amount of the sides of the circumscribed quadrilateral STUV, the input pattern 20b still is determined as an arc.

It is indicated that, the determining of the shapes of the input patterns 20a, 20b as illustrated in FIGS. 4 and 5 takes both of the area ratio and the amount of boundary points as bases. Of course, it is feasible that only the area ratio is taken as sole basis for the determining of the shapes of the input patterns, to distinguish between a circle and an arc.

Figure 6:
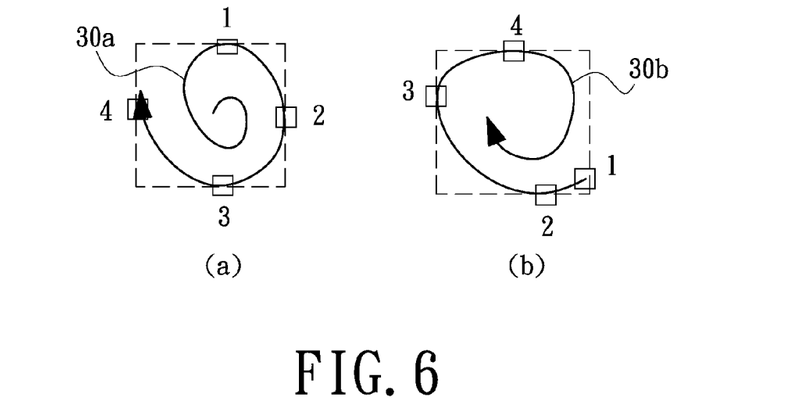
Figure 7:
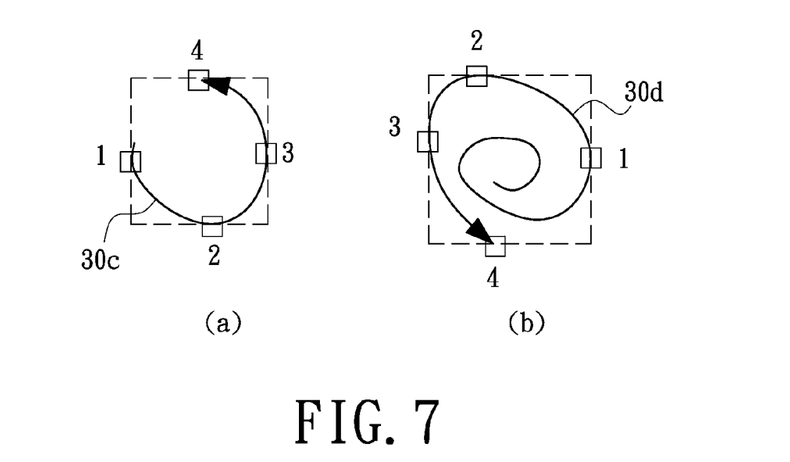

Referring to FIGS. 6(a) and (b), and FIGS. 7(a) and (b), the determining of the directions of circles is taken as an example to illustrate the method of determining input pattern in accordance with the embodiment of the present invention how to determine the direction of an input pattern.

More specifically, as illustrated in FIG. 6(a), the appearance of four boundary points 1, 2, 3 and 4 between an input pattern 30a and a circumscribed quadrilateral (as denoted by the dashed border in FIG. 6(a)) of the input pattern 30a is as per an order from top-most, right-most, bottom-most to left-most in sequence during the input of the input pattern 30a, and thus the order of appearance of the four boundary points 1, 2, 3 and 4 is coincident with clockwise direction. As illustrated in FIG. 6(b), the appearance of four boundary points 1, 2, 3 and 4 between an input pattern 30b and a circumscribed quadrilateral (as denoted by the dashed border in FIG. 6(b)) of the input pattern 30b is as per an order from right-most, bottom-most, left-most to top-most in sequence during the input of the input pattern 30b, and thus the order of appearance of the boundary points 1, 2, 3 and 4 also is coincident with clockwise direction. Accordingly, the input patterns 30a, 30b as illustrated in FIGS. 6(a) and (b) are determined as clockwise circles, i.e., the direction of the circles is clockwise direction.

As illustrated in FIG. 7(a), the appearance of four boundary points 1, 2, 3 and 4 between an input pattern 30c and a circumscribed quadrilateral (as denoted by the dashed border in FIG. 7(a)) of the input pattern 30c is as per an order from left-most, bottom-most, right-most to top-most in sequence during the input of the input pattern 30c, and thus the order of appearance of the boundary points 1, 2, 3 and 4 is coincident with counter clockwise direction. As illustrated in FIG. 7(b), the appearance of four boundary points 1, 2, 3 and 4 between an input pattern 30d and a circumscribed quadrilateral (as denoted by the dashed border in FIG. 7(b)) of the input pattern 30d is as per an order from right-most, top-most, left-most to bottom-most in sequence during the input of the input pattern 30d, and thus the order of appearance of the four boundary points 1, 2, 3 and 4 also is coincident with counter clockwise direction. Accordingly, the input patterns 30c, 30d as illustrated in FIGS. 7(a) and (b) are determined as counter clockwise circles, i.e., the direction of the circles is counter clockwise direction.

It is understood that, the above-mentioned approach for determining the directions of the circles also is applicable to other input pattern, for example, determining an input pattern as a clockwise arc or a counter clockwise arc according to the order of appearance of boundary points between the input pattern and a circumscribed quadrilateral of the input pattern.

In addition, it is indicated that the circumscribed polygon in accordance with the above-mentioned embodiment of the present invention is not limited to be a quadrilateral, and can be other polygons e.g., triangle, pentagon, hexagon, etc. Degrees of internal angles of the circumscribed polygon respectively can be preset fixed values, and even the degrees of the internal angles of the circumscribed polygon are identical with each other. Of course, the degrees of the internal angles of the circumscribed polygon can be random rather than preset fixed values, but the complexity of the determining for the boundary points is unfortunately increased. Hereinafter, only the circumstance of degrees of internal angles of a circumscribed polygon being preset fixed values is described in detail with reference to FIGS. 8 and 9, for the purpose of illustration.

Figure 8:
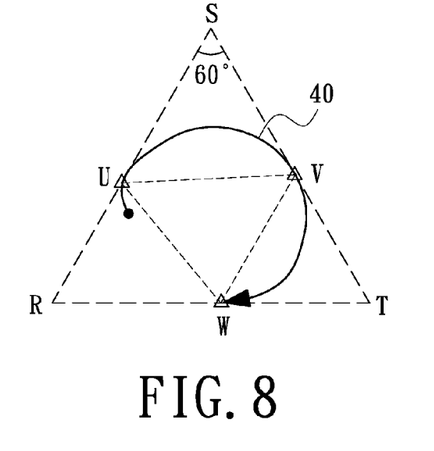
FIG. 8 shows a circumscribed polygon of an input pattern being a circumscribed triangle, in accordance with an embodiment of the present invention.

Referring to FIG. 8, a circumscribed triangle RST is used as the circumscribed polygon of an input pattern 40. All of internal angles of the circumscribed triangle RST are 90 degrees. The input pattern 40 and the circumscribed triangle RST have three boundary points U, V and W existed therebetween. The boundary points U, V and W can be acquired by using collected coordinates of a movement trace of a touch object during the input of the input pattern 40. A polygon UVW defined by the boundary points U, V and W is an inscribed triangle of the input pattern 40. The area of the triangle UVW can be calculated by using the triangle area formula. The area of the circumscribed triangle RST can be easily obtained according to the coordinates of the three boundary points U, V and W of the circumscribed triangle RST. Herein, when an area ratio of the inscribed triangle UVW defined by the boundary points U, V and W to the circumscribed triangle RST is above a preset area ratio threshold, since the amount of the boundary points between the input pattern 40 and the circumscribed triangle RST of the input pattern 40 is equal to the amount of sides of the circumscribed triangle RST, the input pattern 40 would be determined as a circle. The direction of the circle can be determined according to the order of appearance of the boundary points U, V and W during the input of the input pattern 40.

Figure 9:
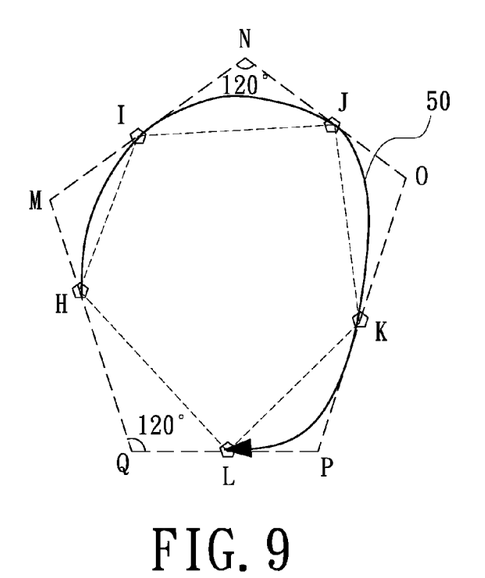
FIG. 9 shows a circumscribed polygon of an input pattern being a circumscribed pentagon, in accordance with an embodiment of the present invention.

Referring to FIG. 9, a circumscribed pentagon MNOPQ is used as the circumscribed polygon of an input pattern 50. All of internal angles of the circumscribed pentagon MNOPQ are 120 degrees. The input pattern 50 and the circumscribed pentagon MNOPQ have five boundary points H, I, J, K and L existed therebetween. The boundary points H, I, J, K and L can be acquired by using collected coordinates of a movement trace of a touch object during the input of the input pattern 50. A polygon HIJKL defined by the boundary points H, I, J, K and L is an inscribed pentagon of the input pattern 50. The area of the pentagon HIJKL is equal to the sum of areas of triangles HIJ, HJK and HKL, and thus can be calculated by using the triangle area formula. The area of the circumscribed pentagon MNOPQ can be easily obtained according to the coordinates of the five boundary points H, I, J, K and L of the circumscribed pentagon MNOPQ. Herein, when an area ratio of the pentagon HIJKL defined by the boundary points H, I, J, K and L to the circumscribed pentagon MNOPQ is above a preset area ratio threshold, since the amount of the boundary points between the input pattern 50 and the circumscribed pentagon MNOPQ of the input pattern 50 is equal to the amount of sides of the circumscribed pentagon MNOPQ, the input pattern 50 would be determined as a circle. The direction of the circle can be determined according to the order of appearance of the boundary points H, I, J, K and L during the input of the input pattern 50.

In practical applications, in order to avoid the occurrence of a false operation caused by user's careless touch on the touch panel 10, the area of a polygon defined by a plurality of boundary points between an input pattern and a circumscribed polygon of the input pattern is given an area threshold. In particular, when the area of the polygon defined by the boundary points is above the area threshold, determining the input pattern is inputted; whereas, when the area of the polygon defined by the boundary points is below the area threshold, determining no the input pattern is inputted. The setting of the value of the area threshold is relevant to a pixel resolution and a panel size of the touch panel 10.

Moreover, the method of determining input pattern in accordance with the embodiment of the present invention can further include the step of generating a corresponding identification code according to the determined shape and/or direction of the input pattern, so as to perform a corresponding operation e.g., zoom in, zoom out, or rotation, etc.

In summary, the method of determining input pattern in accordance with the above-mentioned embodiment of the present invention can carry out an input operation which needs multiple fingers in the prior art, by single touch object (e.g., single finger). Accordingly, the drawback associated with the inconvenience of the electronic apparatus in use and resulting from a small-sized touch panel would not provide enough movement space for multi-touch gestures in the prior art can be overcome, and thus the operability and convenience of the electronic apparatus equipped with a touch panel can be improved. Of course, the method of determining input pattern in accordance with the embodiment of the present invention is applicable to an electronic apparatus equipped with any sized touch panel, rather than only limited to an electronic apparatus equipped with a small-sized touch panel.

Furthermore, the method of determining input pattern in accordance with the above-mentioned embodiment of the present invention can be stored in a computer readable storage medium as a program. When the program is executed, which enables an electronic apparatus equipped with the touch panel 10 to determine the shape and/or direction of an input pattern inputted through the touch panel 10.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of determining input pattern, adapted to be implemented on an electronic apparatus equipped with a touch panel and comprising:

detecting a plurality of boundary points of an input pattern inputted through the touch panel;

defining a first polygon having a plurality of sides and each side of the plurality of sides of the first polygon being a tangent line of one of the boundary points respectively, so that the input pattern being surrounded in the first polygon;

defining a second polygon having a plurality of sides and each side of the second polygon extending between one of the boundary points and another of the boundary points, so that the second polygon being surrounded in the input pattern;

detecting an area ratio of the second polygon to the first polygon; and determining the shape of the input pattern at least according to the area ratio.

2. The method as claimed in claim 1, wherein the input pattern is a non-linear pattern.

3. The method as claimed in claim 1, wherein degrees of internal angles of the first polygon respectively are preset fixed values.

4. The method as claimed in claim 3, wherein the degrees of the internal angles of the first polygon are identical with each other.

5. The method as claimed in claim 1, wherein the step of determining the shape of the input pattern at least according to the area ratio comprises:

when the area ratio is above an area ratio threshold, determining the input pattern as a circle; and when the area ratio is below the area ratio threshold, determining the input pattern as an arc.

6. The method as claimed in claim 1, wherein the determining of the shape of the input pattern is further according to the amount of the boundary points.

7. The method as claimed in claim 6, wherein the determining of the shape of the input pattern comprises:

when the area ratio is above an area ratio threshold and the amount of the boundary points is equal to the amount of sides of the first polygon, determining the input pattern as a circle; and when the area ratio is below the area ratio threshold or the amount of the boundary points is less than the amount of the sides of the first polygon, determining the input pattern as an arc.

8. The method as claimed in claim 1, wherein during the input of the input pattern, when detecting a touch object for inputting the input pattern that maintains contact with the touch panel for a predetermined time interval or detecting the touch object has left from the touch panel, determining the input of the input pattern is completed, the step of detecting the boundary points and the step of detecting the area ratio are started to be implemented after the input of the input pattern is completed.

9. The method as claimed in claim 1, further comprising:
  generating a corresponding identification code according to the determined shape of the input pattern, so as to perform a corresponding operation.

10. The method as claimed in claim 1, further comprising:
  determining the direction of the input pattern according to the order of appearance of the boundary points during the input of the input pattern.

11. The method as claimed in claim 10, wherein the determined direction of the input pattern is clockwise direction or counter clockwise direction.

12. The method as claimed in claim 10, further comprising:
  generating a corresponding identification code according to both the determined shape and direction of the input pattern, so as to perform a corresponding operation.

13. A method of determining input pattern, adapted to be implemented on an electronic apparatus equipped with a touch panel and comprising:

detecting an input pattern inputted through the touch panel;
   defining boundary points by using a first polygon to approach the input pattern; the first polygon having a plurality of sides and each sides of the plurality of sides of the first polygon being a tangent line of one of the boundary points respectively, so that the input pattern being surrounded in the first polygon;
   connecting all of the boundary points to form a second polygon; the second polygon having a plurality of sides and each side of the second polygon extending between one of the boundary points and another of the boundary points, so that the second polygon being surrounded in the input pattern;
   calculating an area ratio of the second polygon to the first polygon; and
   determining the shape of the input pattern according to the area ratio.

14. The method as claimed in claim 13, wherein the input pattern is a non-linear pattern.

15. The method as claimed in claim 13, wherein degrees of internal angles of the first polygon respectively are preset fixed values.

16. The method as claimed in claim 15, wherein the degrees of the internal angles of the first polygon are identical with each other.

17. The method as claimed in claim 13, wherein the step of determining the shape of the input pattern at least according to the area ratio comprises:

when the area ratio is above an area ratio threshold, determining the input pattern as a circle; and
   when the area ratio is below the area ratio threshold, determining the input pattern as an arc.

18. The method as claimed in claim 13, wherein the determining of the shape of the input pattern is further according to the amount of the boundary points.

19. The method as claimed in claim 18, wherein the determining of the shape of the input pattern comprises:

when the area ratio is above an area ratio threshold and the amount of the boundary points is equal to the amount of sides of the first polygon, determining the input pattern as a circle; and
   when the area ratio is below the area ratio threshold or the amount of the boundary points is less than the amount of the sides of the first polygon, determining the input pattern as an arc.

20. The method as claimed in claim 13, wherein during the input of the input pattern, when detecting a touch object for inputting the input pattern that maintains contact with the touch panel for a predetermined time interval or detecting the touch object has left from the touch panel, determining the input of the input pattern is completed, the step of detecting the boundary points and the step of detecting the area ratio are started to be implemented after the input of the input pattern is completed.

21. The method as claimed in claim 13, further comprising:

generating a corresponding identification code according to the determined shape of the input pattern, so as to perform a corresponding operation.

22. The method as claimed in claim 13, further comprising:

determining the direction of the input pattern according to the order of appearance of the boundary points during the input of the input pattern.

23. The method as claimed in claim 22, wherein the determined direction of the input pattern is clockwise direction or counter clockwise direction.

24. The method as claimed in claim 22, further comprising:

generating a corresponding identification code according to both the determined shape and direction of the input pattern, so as to perform a corresponding operation.

* * * * *

UNITED STATES PATENT AND TRADEMARK OFFICE
CERTIFICATE OF CORRECTION

| | | |
|---|---|---|
| PATENT NO. | : 8,887,102 B2 | Page 1 of 1 |
| APPLICATION NO. | : 12/547465 | |
| DATED | : November 11, 2014 | |
| INVENTOR(S) | : Kuang-Yu Fu et al. | |

It is certified that error appears in the above-identified patent and that said Letters Patent is hereby corrected as shown below:

On the title page (75) The correct third inventor's name is Heng-Sheng Chou and the correct fourth inventor's name is Ming-Jong Jou Signed and Sealed this
Sixth Day of October, 2015

Michelle K. Lee
*Director of the United States Patent and Trademark Office*